United States Patent [19]

Armond et al.

[11] Patent Number: 4,947,090

[45] Date of Patent: Aug. 7, 1990

[54] CONTROL FOR RECIPROCATING PART IN A MACHINE TOOL

[75] Inventors: Joseph A. Armond, River Grove; Juanito Rodenas, Carol Stream, all of Ill.

[73] Assignee: Electro-Matic Products Co., Chicago, Ill.

[21] Appl. No.: 370,198

[22] Filed: Jun. 22, 1989

[51] Int. Cl.$^5$ .............................................. H02K 33/00
[52] U.S. Cl. ..................................... 318/282; 318/468; 318/127
[58] Field of Search .............................. 318/119–134, 318/280, 281, 282, 466, 467, 468, 490; 51/2 G, 31, 32, 33 R, 34 C, 34 F, 34 G–34 K, 64, 83 R, 91 R, 113, 114, 121, 122, 143, 151, 157, 165.74, 165.76, 165.77; 74/828, 829, 830, 831, 832, 833, 99 R, 20, 21, 22 R, 22 A, 23, 24, 25, 110

[56] References Cited

U.S. PATENT DOCUMENTS

| | | | |
|---|---|---|---|
| 2,554,080 | 5/1951 | Yardeny et al. | 318/282 |
| 2,994,021 | 7/1961 | Hinz | 318/490 X |
| 3,213,342 | 10/1965 | Littwin | 318/282 X |
| 3,474,573 | 10/1969 | Homeyer | 318/282 X |
| 3,509,436 | 4/1970 | Hovance | 318/127 |
| 3,949,288 | 4/1976 | Littwin | 318/127 |
| 4,179,223 | 12/1979 | Kwan et al. | 318/282 X |
| 4,180,766 | 12/1979 | Matula | 318/128 |
| 4,562,385 | 12/1985 | Rabson | 318/132 X |
| 4,566,224 | 1/1986 | Moldovan et al. | 51/122 X |
| 4,583,027 | 4/1986 | Parker et al. | 318/132 X |

FOREIGN PATENT DOCUMENTS 2052099  1/1981  United Kingdom ................ 318/443

Primary Examiner—Bentsu Ro
Attorney, Agent, or Firm—Paul H. Gallagher

[57] ABSTRACT

In a grinder having a reciprocating table, a pair of oppositely arranged traverse potentiometers are actuated by the table, and in each direction, the respective potentiometer produces an increasing voltage to reverse the table. A pair of remote potentiometers are arranged respectively opposed to the traverse potentiometers, and are manually set to thereby determine the points of reversing of the table. Signal LED's indicate the position of the table, and these are controlled by signal potentiometer that is driven with the traverse potentiometers. Manual switch means enables the operator to selectively run the table past the normal points of reversal set by the remote potentiometers. Means is provided for slowing the speed of movement of the table at the end of its travel to minimize inertial shock.

14 Claims, 8 Drawing Sheets

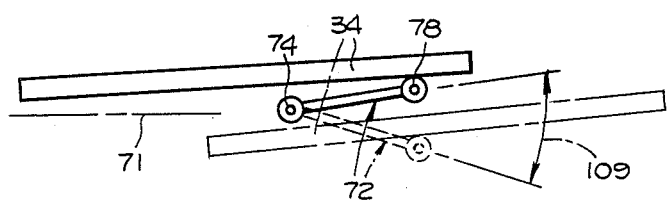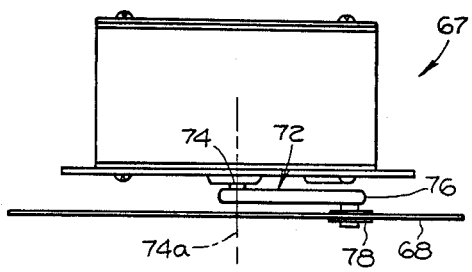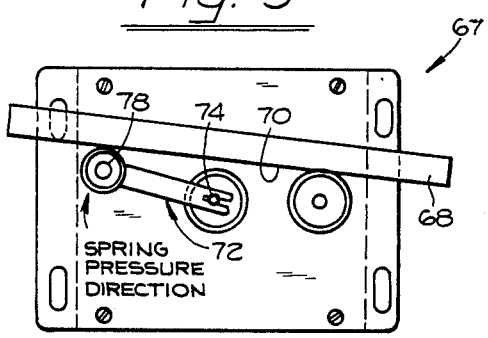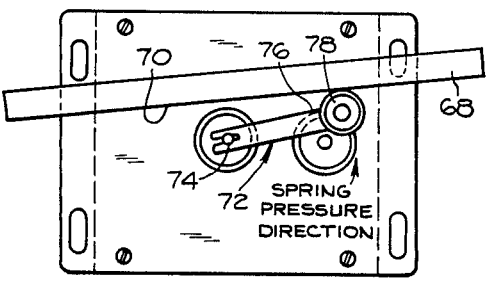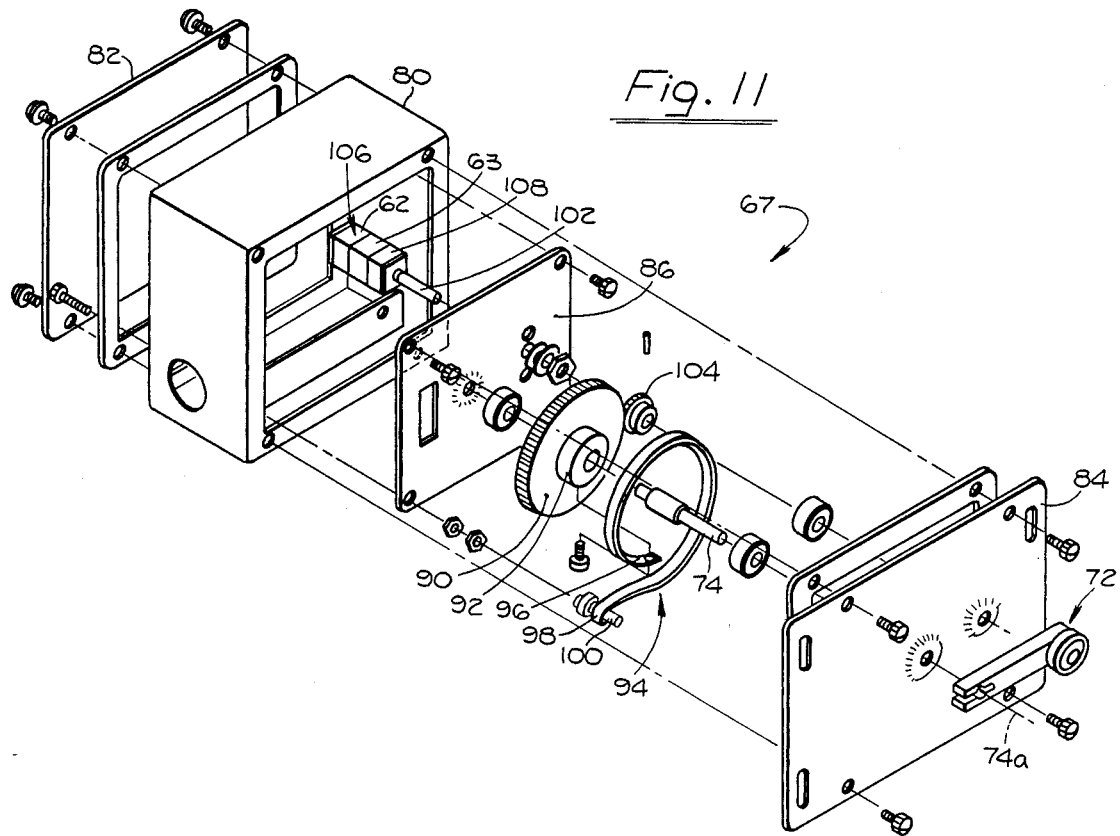

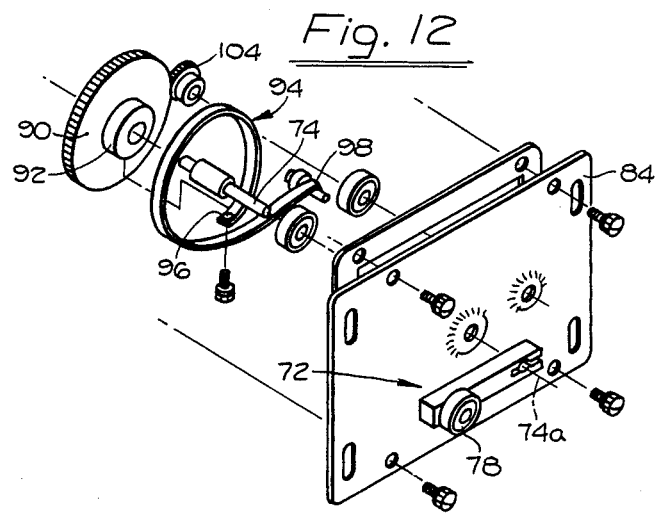
Fig. 12
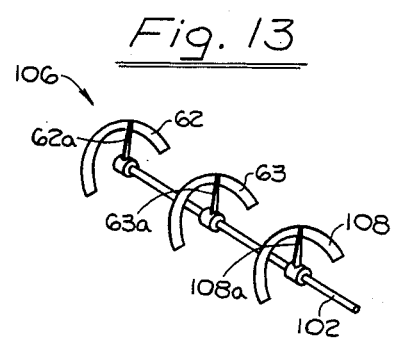
Fig. 13
Fig. 14
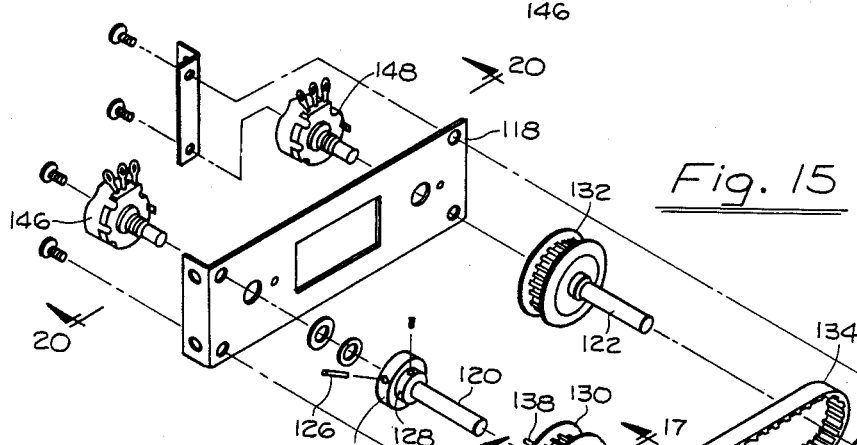
Fig. 15
Fig. 16
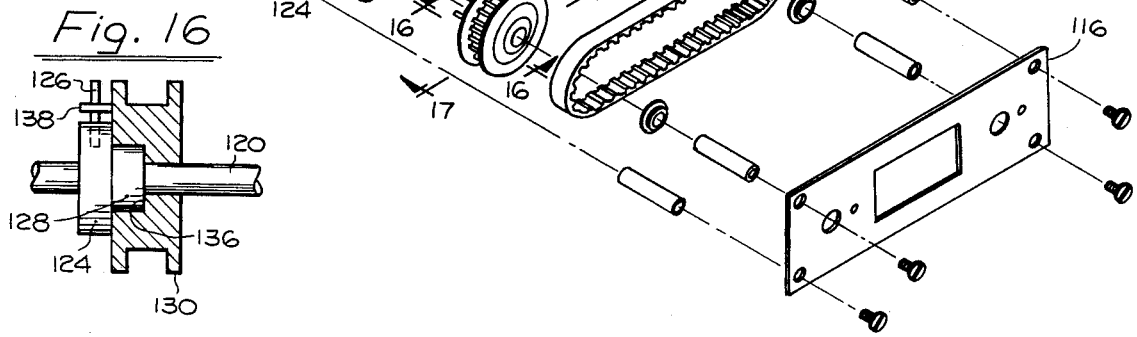

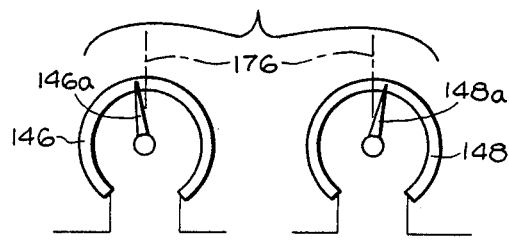
Fig. 20
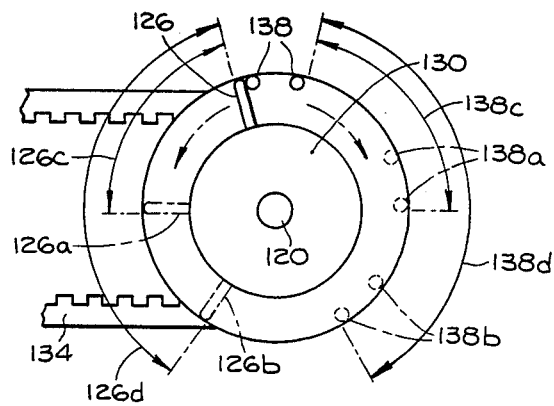
Fig. 17
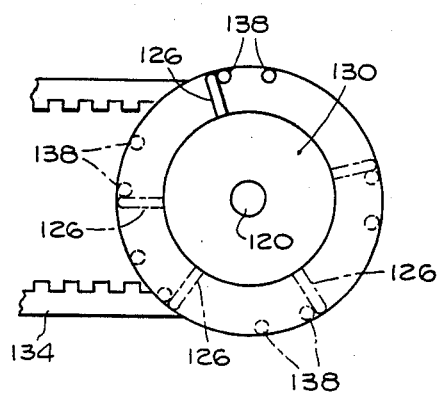
Fig. 19
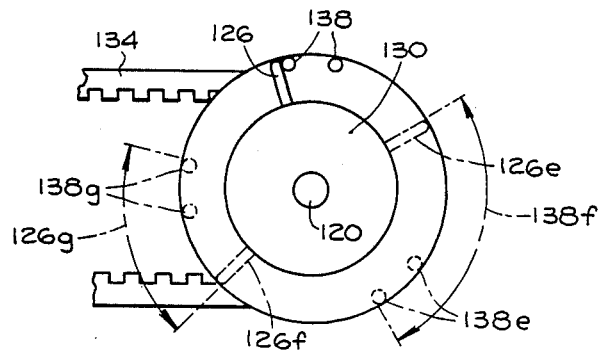
Fig. 18
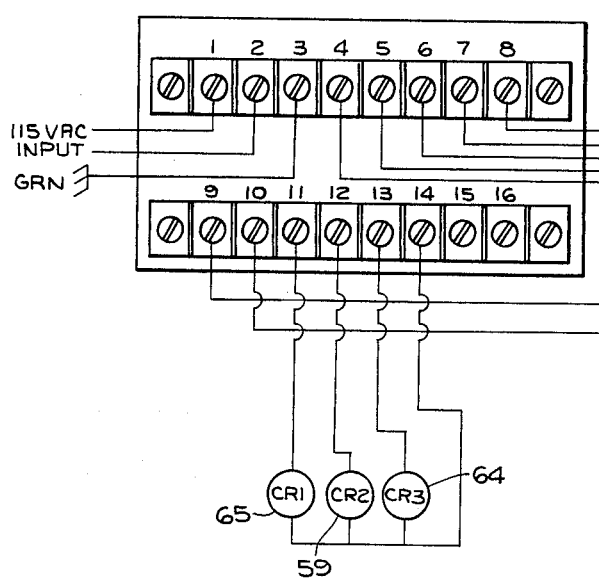
Fig. 21
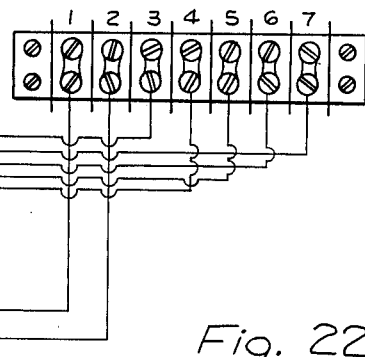
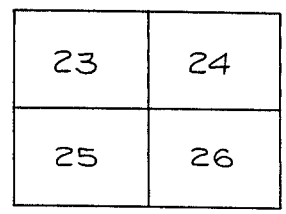
Fig. 22

CONTROL FOR RECIPROCATING PART IN A MACHINE TOOL

SUMMARY OF THE INVENTION

1. The invention finds most use in grinders in industry, of the type having a reciprocating part, such as a surface grinder having a reciprocating table, or a cylindrical grinder having a reciprocating carriage. In the movement of the reciprocating part in each direction, a grinding step is performed, and the part is reciprocated repeatedly until the complete grinding operation is performed.

2. The control or apparatus of the invention effects reversal of the reciprocating part at the end of movement in each direction, a control signal being given by the part itself, to the control, at the end of movement in each direction.

3. The control incorporates a solid state, electronic circuit, greatly simplifying the apparatus, from the standpoint of both manufacture and operation, relative to controls of this general kind heretofore known.

4. The control produces electrical signals for controlling the means for driving the part and utilizes potentiometers actuated by the part for varying the voltages involved, and the potentiometers can be adjusted or pre-set for effecting reversing the part at selected points of its travel.

5. The control includes a series of signal lights indicating the position the part assumes within its full range of movement, so indicating it constantly, and progressively as the table moves.

6. Another feature is that the control is capable of producing slow movement of the reciprocating part as it approaches the end of its movement so as to reduce inertial shock in the reversing step. This feature is of especial advantage in the case of a cylindrical grinder where the carriage is of great size and mass, but it can also be a great advantage in the case of a surface grinder where a workpiece of great weight is carried by the table.

7. The control means includes a feature advantageous particularly in the case of a surface grinder, for automatically controlling reciprocation of the table, and operable for so controlling it for reciprocation within a pre-set range relative to the position of the grinding wheel; the apparatus includes manually actuatable controls for over-riding the automatic controls so as to drive the table beyond that pre-set range, to bring the workpiece beyond and away from the grinding wheel for a special purpose such as measuring or gauging the workpiece.

BRIEF DESCRIPTION OF THE SEVERAL VIEWS OF THE DRAWINGS

FIG. 7 is a front face view of the traverse unit of the apparatus.

FIG. 8 is a top view of the component shown in FIG. 7.

FIG. 9 is a view similar to FIG. 7, but showing certain elements in an alternate position.

FIG. 10 is a detail view showing certain elements of FIG. 7 in different positions.

FIG. 11 is an exploded view of the traverse unit of FIGS. 7-9.

FIG. 12 is a view similar to the righthand portion of FIG. 11, but with certain elements in reverse positions.

FIG. 13 is a semi-diagrammatic view of potentiometers or rheostats contained in the unit of FIG. 11.

FIG. 14 is a front face view of a remote control unit mounted on the grinder.

FIG. 15 is a perspective, exploded view of the elements contained within the remote control unit shown in FIG. 14.

FIG. 16 is a sectional view taken at line 16—16 of FIG. 15.

FIG. 17 is a semi-diagrammatic view taken at line 17—17 of FIG. 15.

FIG. 18 is a view similar to FIG. 17, but with certain of the elements in different positions.

FIG. 19 is a view similar to FIGS. 17 and 18, but with certain of the elements in still different positions.

FIG. 20 is a semi-diagrammatic view oriented according to line 20—20 of FIG. 15.

FIG. 21 is a face view of a terminal mounting plate and related elements of the electrical circuit.

FIG. 22 is a layout of the positional relationship of FIGS. 23-26 showing the electrical circuit.

DETAILED DESCRIPTION

Figure 1:
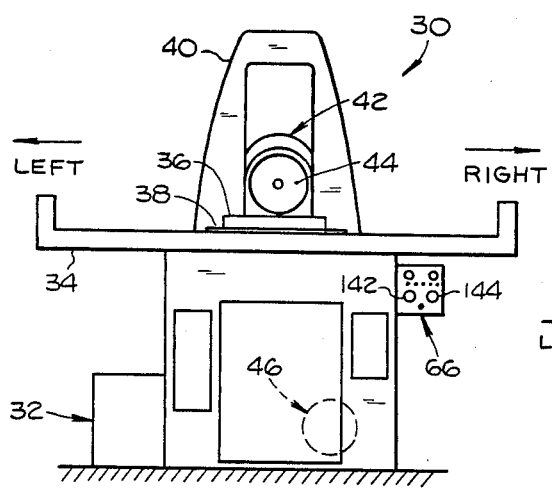
FIG. 1 is a front view of a surface grinder to which the apparatus of the invention is applied.
Figure 2:
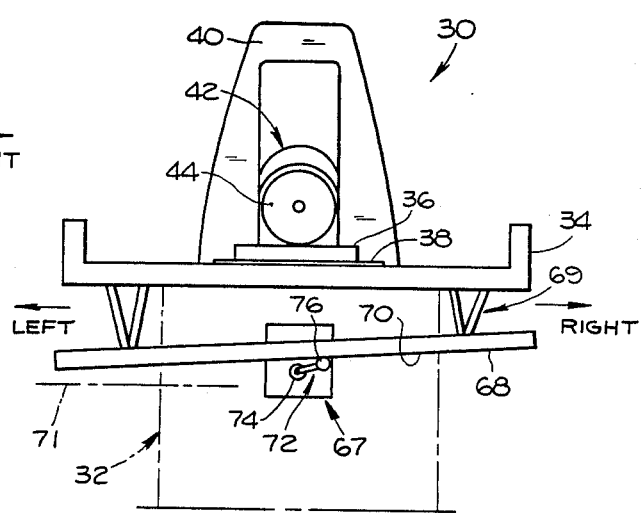
FIG. 2 a semi-diagrammatic view, similar to FIG. 1.

FIGS. 1 and 2 show a standard surface grinder 30 having a base 32 on which is mounted a table 34 supporting a workpiece 36 to be ground. The workpiece is held on the table 34 by a magnetic chuck 38. The grinder includes a column 40 at the rear in which is mounted vertically movable grinding head 42 that includes a grinding wheel 44.

In the operation of the grinder, the grinding head is lowered to bring the grinding wheel into engagement with the workpiece for the grinding operation. In this grinding operation, the table 34 is reciprocated horizontally in right/left directions, as indicated, to move the workpiece past the grinding wheel, as the grinding wheel rotates, in engagement therewith. Such a standard grinder is provided with certain driving means and controls that will be referred to later, but which also include for example a motor 46.

The directions of movement of the table, i.e. right-/left movements, are oriented according to viewing the grinder from the front, as in FIG. 1.

Figure 3:
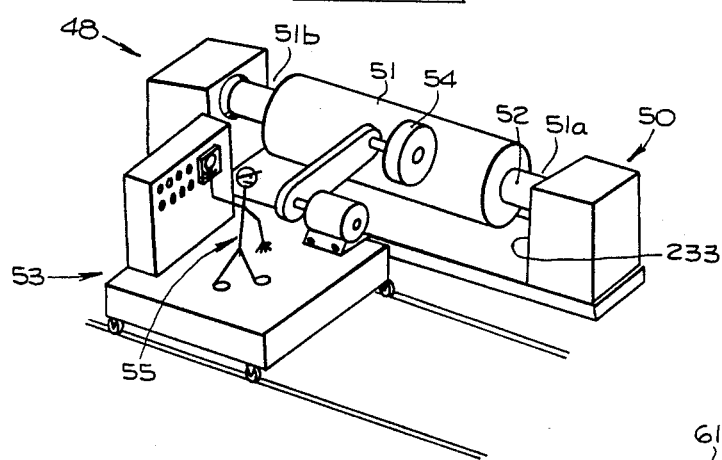
FIG. 3 a perspective view of a cylinder grinder.
Figure 4:
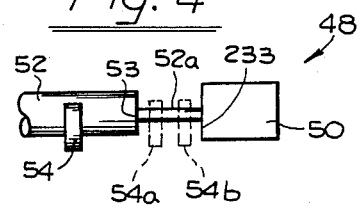
FIG. 4 a top view of a fragment of the grinder of FIG. 3, at the righthand end thereof.

The standard surface grinder of FIGS. 1 and 2 constitute the most common case of applying the invention, but it is also applicable to other kinds of machine tools, such as the cylindrical grinder 48 shown in FIGS. 3 and 4. The cylindrical grinder includes a frame 50 in which is mounted a roll 51, such as a steel roll, having a shaft 52, the ends of the roll being spaced from the elements of the frame at 51a, 51b. The cylindrical grinder includes a carriage 53 having a grinding wheel 54 for grinding the steel roll, the carriage being mounted for traveling transversely for moving the grinding wheel along the steel roll. The nature of the cylindrical grinder is such that the operator 55 rides on the carriage, and in the normal operation of the cylindrical grinder, the grinder wheel 54 moves into the spaces 51a, 51b, and assumes dot-dash line positions 54a, 54b, shown in the space 51a. which will be referred to again hereinbelow in connection with the "slow approach" feature.

Figure 6:
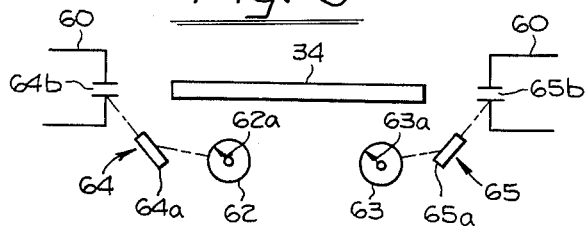
FIG. 6 is a detail of the electrical circuit used in the apparatus of the invention.
Figure 6A:
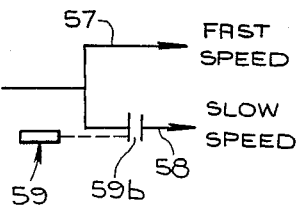
FIG. 6a is a detail of certain elements of the electrical circuit utilized in the cylindrical grinder of FIG. 3
Figure 23:
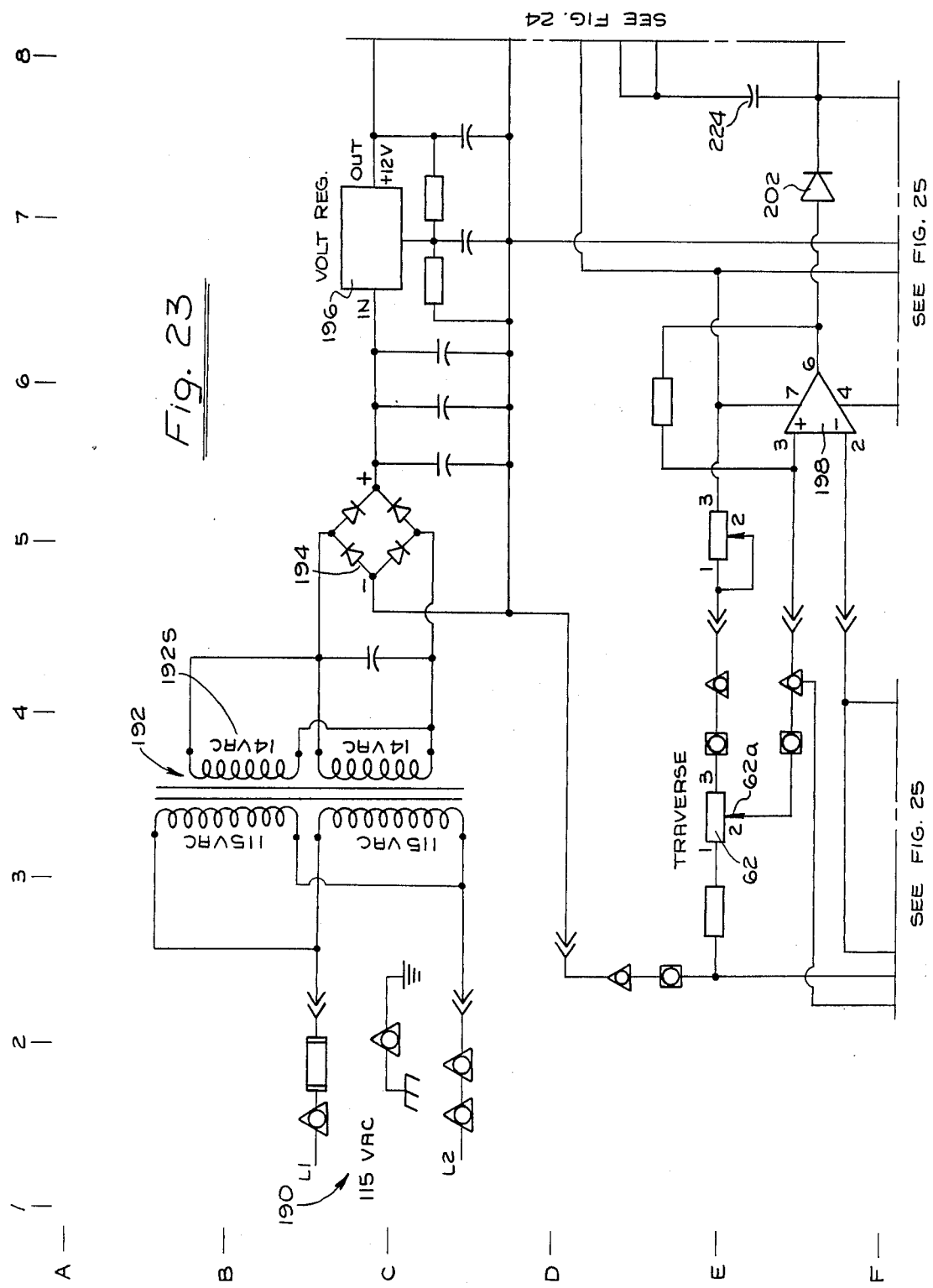
FIG. 23 is a portion of the electrical control circuit.

FIG. 6a shows diagrammatically a detail of the circuit utilized in the "slow approach" mode. A conductor 57 represents fast speed of the carriage, and conductor 58 slow speed. Contacts 59b of a relay 59 are incorporated in the conductor 58. These contacts are normally open, and when they are open, the carriage is moved at fast speed, and when they are closed, as referred to hereinbelow, the carriage is moved at slow speed. It will be understood that this is merely a representation of any of the various ways in which the control can be effected.

In applying the control apparatus of the invention to these machine tools, namely the surface grinder and the cylindrical grinder, the principal consideration is the reciprocating member, i.e. the table 34 (FIGS. 1 and 2) of the surface grinder and the carriage 53 (FIGS. 3 and 4) of the cylindrical grinder, the control apparatus being utilized for controlling such reciprocating movements of those movable members.

Figure 5:
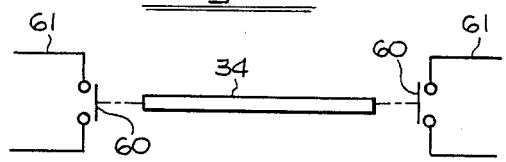
FIG. 5 is a detail of an electrical circuit utilized in the grinder.

Each grinder is provided with standard means for reversing the movement of the reciprocable part. Such is represented diagrammatically in FIG. 5, where the table 34 is shown, and at the ends are switches 60 which upon being actuated by the table, control the reversing of the table. The table may be driven by a hydraulic motor, electrical motor, etc. and need not be described in detail. The switches are incorporated in electrical circuit elements 61, and at the ends of the movement of the table, the respective switches are actuated and the table is reversed. The same operation is utilized in reversing the carriage 53 of the cylindrical grinder of FIG. 3.

The apparatus of the present invention (FIG. 6) utilizes traverse potentiometers or rheostats 62, 63, having arms 62a, 63a, driven by the table. The potentiometers are arranged for controlling voltage for in turn controlling relays 64 and 65, which include electromagnets 64a, 65a, and contacts 64b, 65b, respectively, the contacts being incorporated in the electrical circuit elements 61, of FIG. 5. The following includes detailed description of the operation of the potentiometers and relays, and the components that are controlled by those elements are referred to hereinbelow.

Referring again to the surface grinder of FIGS. 1, 2, the apparatus of the invention includes a remote control unit 66 (FIG. 1) and a traverse control unit 67 (FIG. 2), the details of both of these units being set out hereinbelow. The remote control unit 66 is preferably mounted at the front of the grinder for convenience to the operator, who must utilize it for making various adjustments during a grinding operation. The traverse unit 67 may be mounted in any convenient location, but because the construction and shape of various grinders are different, the details of mounting it are omitted. It is shown in diagrammatic arrangement in FIG. 2, with the grinder oriented the same as in FIG. 1, for convenience in showing the RIGHT and LEFT movements of the table, and the functioning of various elements according to those movements.

For actuating the traverse unit 67, a taper bar 68 is mounted on the table, by convenient means such as indicated at 69, and it of course rides with the table. The taper bar 68 may actually be a parallelogram, but it includes a lower working edge 70 that is inclined to the direction of movement of the taper bar which is horizontally, as indicated by the horizontal reference line 71 (FIGS. 2, 10). The traverse unit 67 includes an exterior actuating arm 72 pivotally mounted on a shaft 74 in the traverse unit, the shaft having an axis 74a. (FIG. 11) The actuating arm has a free end 76 on which is mounted a follower roller 78 that engages the lower inclined working edge 70 of the taper bar. Further details of this arrangement will be referred to hereinbelow.

Reference is now made to FIGS. 11, 12, showing the details of the traverse unit 67, and in these figures the actuating arm 72 will be observed. The traverse unit includes a housing or casing 80 having a bottom closure element 82 and a top cover 84, as well as a mounting plate 86 in the interior of the housing. The unit includes the shaft 74, also referred to as a main shaft, extending through the top cover 84, on which the actuating arm 72 is mounted, as referred to. Also mounted on the shaft 74 is a spur gear 90, having a hub 92. A coil spring 94 has an inner end 96 secured to the hub 92 and an outer end 98 fixedly secured to a pin 100 mounted on the mounting plate 86.

The traverse unit also includes a supplementary shaft 102 on which is secured a pinion gear 104 in mesh with the spur gear 90. It will be noted that the spur gear 90 is of relatively great size and the pinion gear 104 of greatly reduced size.

Figure 24:
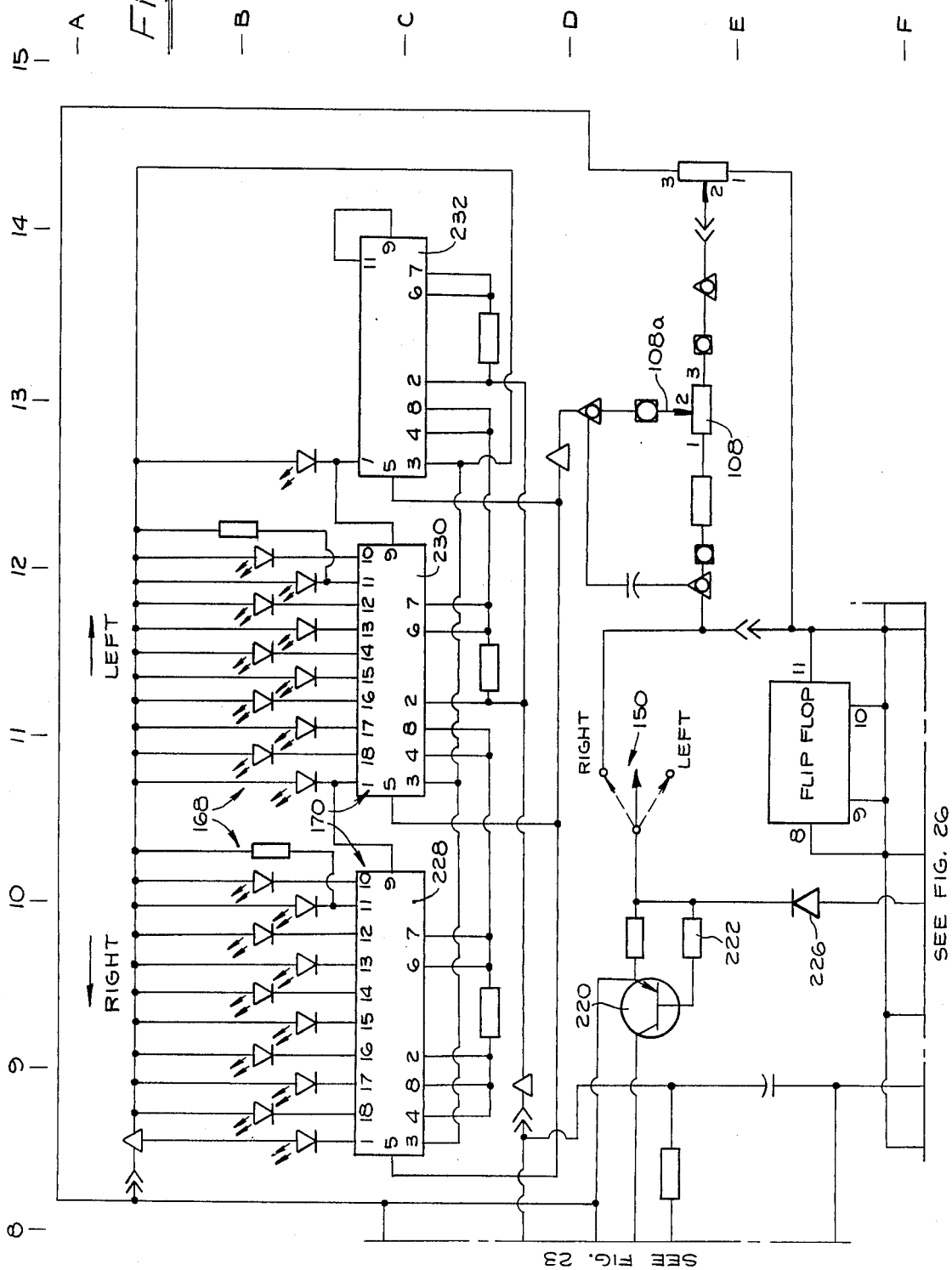
FIG. 24 is a portion of the electrical control circuit.
Figure 25:
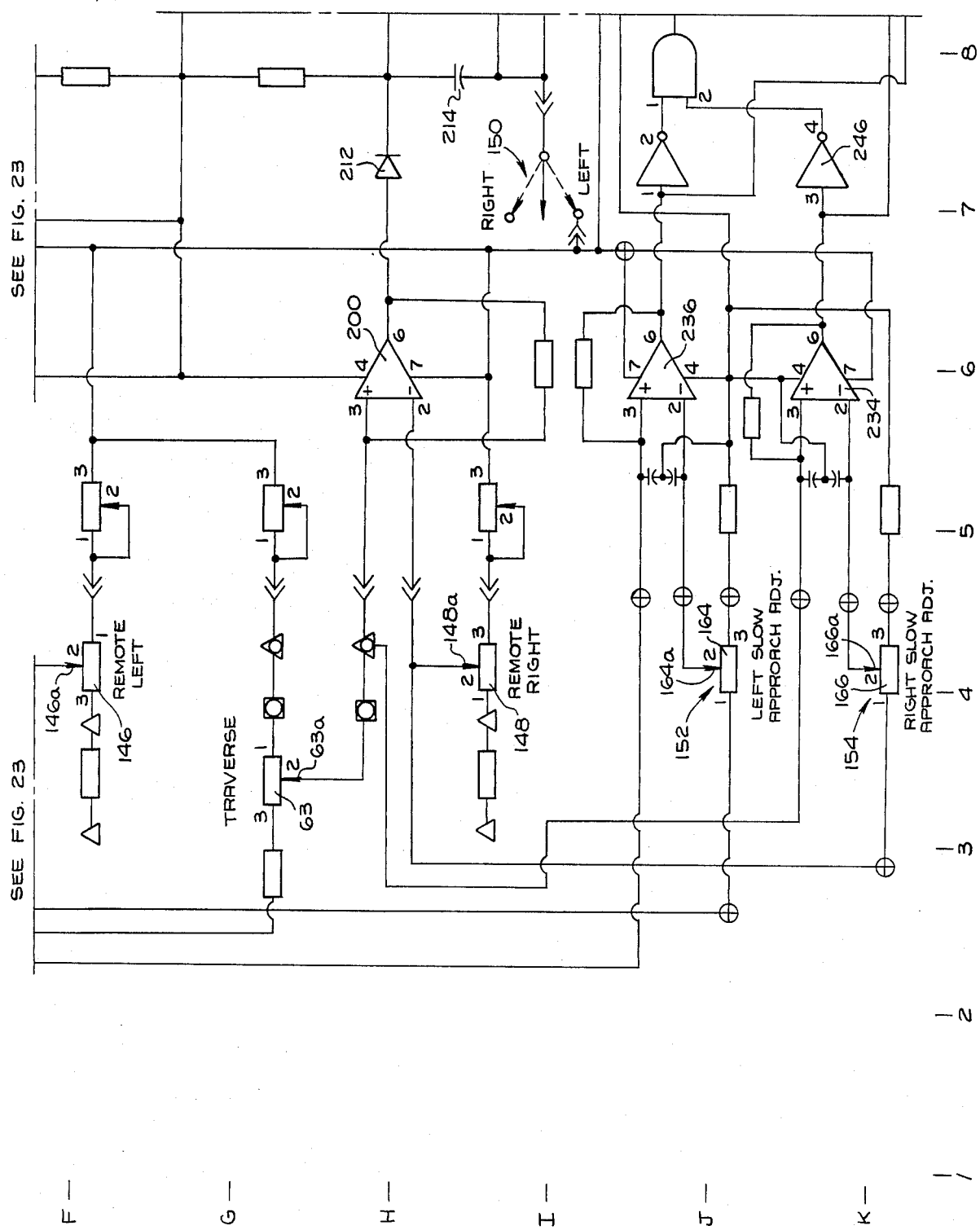
FIG. 25 is a portion of the electrical control circuit.
Figure 26:
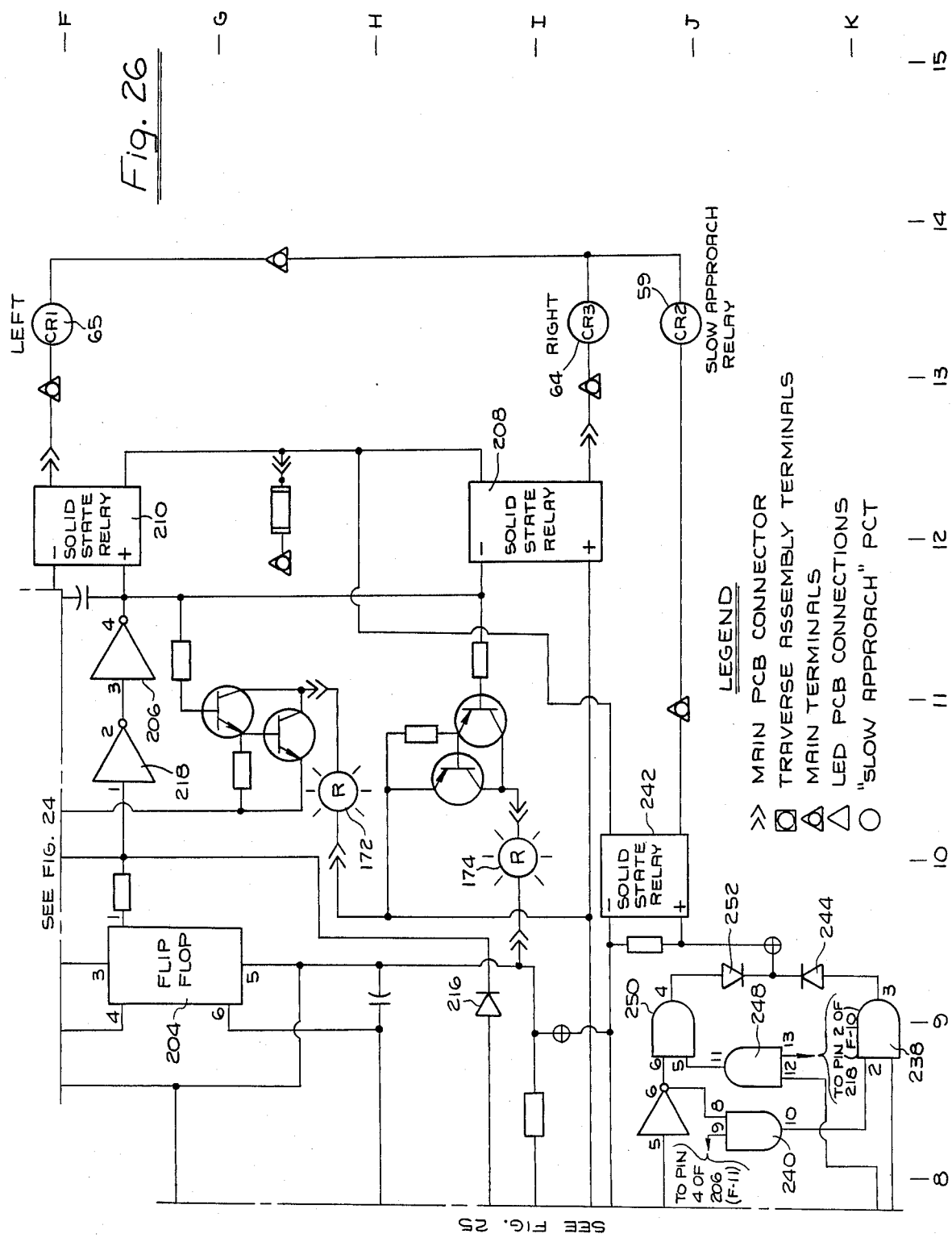
FIG. 26 is a portion of the electrical control circuit.

Also incorporated in the traverse unit is a potentiometer assembly 106, associated with the shaft 102, which includes three potentiometers or rheostats, the two, 62, 63, identified above, and a third potentiometer 108 having an arm 108a (see also FIG. 13). They are all controlled simultaneously with rotation of the shaft, the arms 62a, 63a, 108a, being mounted on the shaft. These potentiometers are also incorporated in the circuit of FIGS. 23-26 and their functions will be described in detail hereinbelow. The potentiometer 108 is not associated with a relay, as are the potentiometers 62, 63, but it controls signal lights (FIGS. 14, 24).

As a general statement of the operation of the traverse control unit 67, as the table 34 moves "left", as indicated in FIG. 2, the taper bar 68 is so inclined that the actuating arm 72 swings upwardly, i.e. in counter-clockwise direction. This rotates the shaft 74 (FIG. 11) and thus the gear 90 in that direction, and rotates the pinion gear 104 and the shaft 102 in the opposite direction, and actuating the potentiometers in corresponding direction. The actuating arm is so swung by the spring 94 which maintains it in following engagement with the taper bar. When the table moves to the right, the taper bar positively swings the actuating arm in clockwise direction, against the action of the spring 94. Accordingly in movement of the table in each of its opposite directions, the potentiometers 62, 63, 108, together are moved in corresponding directions.

The length of the actuating arm 72 and the inclination of the taper bar 68 are so pre-selected that (FIG. 10) the angle 109 of throw of the arm, throughout the full movement of the table, produces rotation (FIG. 11) of the gears 90 and 104 such that the arm of the potentiometers 62, 63, 108, swing nearly, but less than, a full revolution. This movement of the potentiometers will be referred to again hereinbelow.

The apparatus of the invention is well adapted to being retrofitted to an existing grinder. Sometimes it may be difficult to mount the taper bar 68 in a most desired position, and in different circumstances the taper bar may be mounted in different positions, such as represented in FIGS. 7 and 9 respectively. It will be seen that the taper bar in these figures is mounted in oppositely inclined positions, and to accommodate that, actuating arm 72 is mounted in opposite directions. Also, the tension spring 94 may be mounted oppositely, as shown in FIG. 12. These opposite mountings provide for movement in the desired directions of various elements and components in the different mountings.

Reference is made to the remote control unit 66 identified above, included in FIG. 1, and shown in detail in FIGS. 14–20. Generally, and briefly, the remote control unit includes manually manipulatable potentiometers, identified as left and right, that cooperate with the left and right potentiometers 62, 63, shown in FIGS. 11 and 13. These potentiometers are included in the electrical circuit of FIGS. 23–26 and their functions and interactions will be described hereinbelow.

The mechanical construction of the remote control unit is shown best in FIGS. 14, 15. The unit includes a suitable casing 114 (FIG. 14), front and rear mounting plates 116, 118, a left hand shaft 120, and a right hand shaft 122. Fixedly mounted on the left hand shaft 120 is a cylindrical element 124 having a radial pin 126 extending outwardly therefrom, and a reduced hub 128. Mounted on the left and right hand shafts, are pulleys 130, 132, on which is trained a belt 134, these pulleys and belts preferably being toothed.

The pulley 130 is free running on the left hand shaft and is fitted to the element 124, with the hub 128 received in a recess 136 in the pulley. The pulley has axial pins 138 extending to the far side of the element 24 (FIG. 16) engageable with the radial pin 126, under certain conditions, as will be referred to.

The pulley 132 is fixed on the right hand shaft 122 and the movement of the pulleys will be referred to again hereinbelow.

The mounting plate 116 (FIG. 14) may be mounted on the casing, and the shafts 120, 122, extend therethrough and through a front plate 140, where they are provided with LEFT and RIGHT knobs 142, 144.

Mounted on the opposite, or inner, ends of the shafts 120, 122, are potentiometers or rheostats 146, 148, (see also FIG. 20) having arms 146a, 148a. These potentiometers, as indicated above, cooperate with the potentiometers 62, 63. For convenience, the potentiometers 62 and 146 may be referred to as a potentiometer unit and similarly, the potentiometers 63 and 148 may be referred to as a potentiometer unit.

Also mounted at the front of the remote control unit 66 (FIG. 14) is a manual switch, or toggle switch, 150 which is selectively positionable between LEFT and RIGHT positions as indicated. Also mounted at the front plate 140 are manual adjustment members 152, 154, for use in LEFT slow approach, and RIGHT slow approach, as will be described hereinbelow. FIG. 14 shows these adjustment members as including shafts 156, 158, associated with potentiometers 164, 166 (FIG. 25), and having arms 164a, 166a, operable with the potentiometers.

Also mounted on the front plate 140 (FIG. 14) is a series of visual signal indicators, indicated as a group at 168 (see also FIG. 24). These indicators are LED's and are individually numbered by numerals 170. The center one, the numeral 0, represents the center position of the table in the grinder, and those at the opposite sides of that center LED, and at the ends of the series, represent the positions of the table toward the ends of the maximum range of movement of the table. The specific functioning of these LED's will be referred to again hereinbelow.

Above the LED's as viewed in FIG. 14, are LEFT and RIGHT signal lights 172, 174 (see also FIG. 26), to indicate the direction of movement of the table.

In general, in the use of the remote control unit 66, the potentiometers 146, 148, are rotated by the shafts 120, 122, in response to manual rotation of the knobs 142, 144. In response to turning the RIGHT knob 144, the potentiometer 148 (FIGS. 14, 20) is turned, as stated, and the pulley 132 rotates with the shaft, and acting through the belt 134, turns the pulley 130 which is free running on the shaft 120. Correspondingly upon manual manipulation of the LEFT knob 142, the shaft 120 is rotated and the corresponding potentiometer 146 is rotated or adjusted, but in most instances, it does not turn the pulley 130. These potentiometers 146, 148, have a median position representing the median position of the table in its maximum range of movement. This position, in this case, is an upper position, as represented in FIGS. 17–20. The position is also indicated in FIG. 14 where the knobs 142, 144, are in a median position as indicated by the pointers 175 indicating the number 50, in a series of 0–100, on the knobs. In this position the potentiometers 146, 148, (FIG. 20) are adjacent that median position, slightly displaced therefrom. In this figure, vertical lines 176 are shown passing through the shafts 120, 122, and the potentiometers arms 146a, 148a, are respectively on the left and right sides of the vertical lines. In this position also, the radial pins 126, and axial pins 138 (FIGS. 17–19) are adjacent each other. In most cases, these potentiometers are adjusted to represent movements toward the ends of the table, and in making such adjustments, the right hand knob 144 is adjusted to the right, this rotating the pulley 132, and through the belt 134, the pulley 130 also to the right. This does not move the left hand shaft 120. Because the pins 138 are positioned to the right of the pin 126 (FIG. 17), movement of the RIGHT knob, and the shaft, to the right, does not move the shaft 120, or potentiometer 146. The knob and shaft can be moved to selected positions 138a, 138b, the angles of these movements being indicated at 138c 138d. This latter condition is indicated by the full line position of the pin 126 at the top (FIG. 17). In a similar manner, the LEFT shaft 120 can be rotated to the left by the corresponding LEFT knob 142 which moves the pin 126 (FIG. 17) away from the pins 138, to selected positions 126a, 126b, this latter movement representing movement of the potentiometer toward the left hand end of the maximum range of movement of the table. The angles of movement of pin 126 are indicated at 126c, 126d.

When the potentiometers 146, 148, are moved to their extreme outer adjusted positions (FIG. 17), as indicated by the locations of the pins 126, 138, the table is enabled to move through its maximum range.

Not only can the potentiometers 146, 148, be moved in opposite directions toward the respective ends of the table, as represented in FIG. 17, but it is also possible to move both of them to positions corresponding to one side of the center, toward the end of the table. Such a position is represented in FIG. 18. In this case the RIGHT knob 144 can be moved to its extreme right position as represented by the axial pins 138 in their limit position 138e, and the radial pin 126 in a position indicated at 126e at the same end to the range of movement, but spaced apart from the pins 138 at an angle 138f. In a similar manner the LEFT potentiometer may be moved to its extreme left position represented by position 126f, and the pins 138 at position 138g, at the same side of the center, but spaced from the pin at 126f, an amount indicated by the angle 126g.

According to the settings of FIGS. 17, 18, the table moves through smaller ranges, at the various locations in the maximum range of its movement.

As noted above, the potentiometers 146, 148, cannot overlap, but are limited to their minimum spaced position represented in FIG. 20 by the interengagement of the radial pin 126 and axial pins 138 (FIG. 15). This establishes a minimum range of movement of the table. If it is desired to have that same minimum range of movement, rather than at the center of the maximum range, to be located at one end of that range, this can be easily accomplished for either the RIGHT or the LEFT. If it is desired to have this minimum range established at the RIGHT, the LEFT knob (FIG. 14) is turned to the RIGHT, and the radial pin 126 (FIG. 19) turns the pulley 130 and, through the belt 134, turns the pulley 132. Thus both potentiometers are moved to the RIGHT, and maintained at the same minimum spacing. The opposite effect is accomplished by turning the RIGHT knob (FIG. 14) to the LEFT, and an opposite movement is produced (FIG. 19), that is, the pulley 132 acting through the belt 134 drives the pulley 130, and the axial pins 138 engage the radial pin 126 and the two shafts, and potentiometers, are turned together. In this case also, the minimum range is maintained throughout the movement, and that minimum range can be located at any position in the left hand part of the maximum range desired, according to the amount of movement of the knob 144. This minimum range is indicated by the pins 126, 138, being closely adjacent in each of the locations shown.

The potentiometers 146, 148, are limited in their outward movement by internal stop means.

FIG. 21 shows a portion of the electrical control circuit that includes the relays 64, 65, 59.

Attention is directed to the electrical control circuit of FIGS. 23–26, which includes certain of the electrical elements referred to above in the description of the mechanical structure of the various components. Coordinates are provided in the control circuit, for convenience in locating the elements referred to. The coordinates will be indicated in parenthesis in the following description, following the respective elements identified.

A suitable electrical source 190 (C-1) is provided, and a step down transformer 192 has a secondary 192S of suitable voltage such for example as 14V. The output leads to a rectifier 194, the DC output of the rectifier being regulated by a regulator 196, and the output of this regulator of 12V DC supplies the power requirement of the entire control circuit.

The potentiometers of FIGS. 11, 13, are incorporated in the circuit, 62 (E-3), 63 (G-3), 108 (E-13), and it is to be noted, as mentioned above, that these three potentiometers are actuated simultaneously, by the movement of the table, through the actuating arm 72 (FIG. 11).

The remote control potentiometers 146, 148, (FIGS. 14, 20) are shown in the circuit (F-4, I-4).

The potentiometers 62, 146, are associated with the LEFT movement of the table, and the potentiometers 63, 148, are associated with the RIGHT movement. Included in the circuit are comparators 198 (F-6), 200 (H-6), respectively associated with the LEFT and RIGHT directions of movement.

The potentiometers 146, 148, (see also FIG. 20) are set respectively by the knobs 142, 144, (FIG. 14). In the movement of the table to the LEFT for example, the potentiometer 62 (E-3) is moved in advancing direction, increasing the voltage applied to the pin 3 of the comparator 198. The setting of the potentiometer 146 (F-4) controls the voltage applied to pin 2. The voltage controlled by the potentiometer 62 (E-3) at this point is at a value less than that at pin 2. In this condition, the output of the comparator 198, at pin 6 is LO, and when the table continues to move, the voltage at potentiometer 62, as controlled by the arm 62a, increases, and when it exceeds the voltage at pin 2, the output of pin 6 goes HI.

A similar operation takes place in the opposite direction of the table, in association with the corresponding potentiometers, namely 63 (C-3), 148 (I-4), comparator 200 (H-6).

The traverse potentiometers 62, 63, are connected to opposite polarities, and moved together, and in either extreme position, the voltage of one of the potentiometers is a maximum, or 12V DC, while that of the other one is zero. It is to be noted that the remote potentiometers 146, 148, are also connected to opposite polarities.

The traverse potentiometers 62, 63, are so arranged and connected that the maximum voltage value thereof is reached when the table is at the respective ends of its maximum range of movement, and when the corresponding remote control potentiometers 146, 148, are set at their maximum voltage settings, the voltages of the traverse potentiometers 62, 63, are similar to those of the remote potentiometers so that the maximum voltage of the traverse potentiometers is reached at the positions noted, namely at the ends of the maximum range of movement. In a similar manner, when the remote potentiometer is set at a lesser value, the voltage of the traverse potentiometer reaches a lesser value at the corresponding point, which is short of the end of the maximum range of movement. When the voltage set by the remote potentiometers is reached by the voltages controlled by the traverse potentiometers, the reversal of the table is produced as set out hereinbelow.

To correlate the mechanical movements with the functioning of the elements in the electrical circuit, reference is made to FIGS. 7, 2, where the traverse unit 67 is viewed at the front of the machine. As the table moves to the LEFT, as so viewed, the taper bar 68 effects movement of the actuating arm 72 in counter-clockwise direction, and (FIG. 11) the gear 90 also moves counter-clockwise, and the gear 104 in clockwise direction, and correspondingly the potentiometers 62, 63, 108, also in clockwise direction. This clockwise direction as applied to potentiometer 62 (E-3) moves the arm 62a thereof. In this condition the voltage established by that potentiometer is increasing, and as noted above, when that voltage at pin 3 of the comparator 198 exceeds that of pin 2, the output at pin 6 goes HI.

When this happens, the output is conducted to diode 202 (F-7), then to pin 4 of flip-flop 204 (G-9) resulting in the following steps. Pin 1 of the flip-flop goes LO, pin 4 of the gate 206 (G-11) goes LO, producing a forward bias on the solid state relay 208 (I-12) and turning it ON. This energizes the relay 64 (I-13) (see also FIG. 6). Simultaneously therewith, the solid state relay 210 (F-12) is reverse biased, and therefore turned OFF, and the relay 65 (F-13) (see also FIG. 6) is de-energized.

The energization of the relay 64 (I-13) and the de-energization of the relay 65 (F-13) effects reversal of the table. The direction of the movement of the table in the foregoing description, was to the LEFT, and upon the reversal noted, moves to the RIGHT, and in this movement, the traverse potentiometers 62, 63 (FIGS. 11, 13) rotate in counter-clockwise direction. In this case also it is assumed that the remote potentiometer 148 (I-4) is adjusted to a predetermined setting, producing a corresponding voltage at pin 2 of the comparator 200 (H-6). Upon movement of the traverse potentiometer 63 (G-4) as noted, the voltage established by that potentiometer increases and is conducted to pin 3 and when it exceeds the voltage at pin 2, which was theretofore higher than at pin 3, the output at pin 6 goes HI, and transmits a corresponding signal to diode 212 (H-7), and then to pin 6 of flip-flop 204 (G-9). The output at pin 1 of the flip-flop 204 now becomes HI and correspondingly, pin 4 of gate 206 (G-11) also goes HI. Accordingly the solid state relay 210 (G-12) is forward biased and turned ON. This energizes the relay 65 (F-13). At this point the solid state relay 208 (I-12) is reversed biased and this de-energizes the relay 64 (I-13). This again effects reversal of the table, which then moves to the LEFT.

Means is provided for manually overriding the controls just described above, which operate in an automatic manner, and to manually reverse the movement of the table, immediately, before the table reaches the end of its movement according to previous settings. As a starting point, it is assumed that the table is being moved to the RIGHT. The manual toggle switch 150 (D-11, I-7) is in its normal position shown. To produce the intended control, during this movement of the table to the RIGHT, the switch 150 (I-7) (FIG. 14) is manually moved to the LEFT. This completes the circuit through the switch and applies positive 12V to the capacitor 214 (I-8) and applies a positive pulse to the pin 6 of the flip-flop 204 (G-9) causing it to flip-flop, causing the output pin 1 thereof to go HI. At this moment the solid state relay 210 (F-12) is turned ON, thereby energizing the relay 65 (F-13) causing the table to reverse direction, or in this case move to the LEFT. To perform this function, the switch 150 (I-7) is held in LEFT position. In this position the positive voltage is applied to diode 216 (I-9), then to pin 1 of gate 218 (F-11). This causes pin 4 of gate 206 (F-12) to go HI, turning ON the solid state relay 210 (F-12) which energizes the relay 65 (F-13) and causes the table to go LEFT. By holding switch 150 (I-7) CLOSED in LEFT position, the flip-flop 204 (G-9) is bypassed, thus holding relay 65 (F-13) energized. The table then continues to the LEFT, bypassing the settings of the remote control potentiometer 146 (F-4), 148 (I-4).

This step, of overriding the automatic controls, is useful when it is desired, for example, to move the table away from the area of the grinding wheel in the grinder of FIGS. 1 and 2, without disturbing the settings of the workpiece.

A similar, but essentially opposite, operation takes place in the movement of the table in the other direction. In the latter case, the condition is assumed that the table is moving to the LEFT, and then the switch 150 (D-11) is moved to the RIGHT. The common is applied to the base of transistor 220 (D-9) through resistor 222 (E-10). which turns ON the transistor. This puts a positive pulse simultaneously to pin 4 of flip-flop 204 (G-9) from the capacitor 224 (E-8). This flip-flops the output at pin 1 of the flip-flop 204 (G-9), making it go LO. The pin 4 of the gate 206 (F-11) goes LO, which turns on the solid state relay 208 (I-12) and energizes the relay 64 (I-14) and causes the table to reverse direction. As the switch 150 (D-11) is held to the RIGHT position, the common goes through the switch and through diode 226 (E-10), making pin 1 of gate 218 (G-11) go LO. This also makes pin 4 of gate 206 (G-12) go LO. As a result of this, the solid state relay 208 (I-12) is turned ON, which energizes the relay 64 (I-13) and causing the table to go RIGHT. In this case also, the table will continue to move to the RIGHT regardless of the previous settings of the remote control potentiometers 146 (F-4), 148 (I-4).

The signal lights 168 identified above in connection with FIG. 14, are included in the circuit, in FIG. 24 at the top. The signal lighted are divided in two groups, one light at the center being a zero position, and as the table moves, the signal lights corresponding to that direction of movement are lighted, lighting serially in the direction of movement, as each light being lighted, the previous one being extinguished, in each direction. There are ten lights in each half, each light indicating 1/10the movement of the table in the respective half of the total range of movement.

The operation and functioning of the signal lights is as follows. The potentiometer 108 (E-13) (see also FIG. 11) as indicated above moves with the traverse potentiometers 62 (E-4), 63 (G-4). If the table is moving to the LEFT, for example, the potentiometer 108 (E-13) is moving clockwise, and the voltage at pin 5 of the line-dot bar drivers 228, 230, 232 (C-10, C-12, C-14), increases in voltage, and the lights or LED's light up one at a time from RIGHT to LEFT. These LED's light throughout the range of movement of the table. For example, if the table begins from a central position, and moves to the LEFT, the LED's connected with the driver 230 light up serially, and as the table moves in the other direction, those LED's are extinguished, also serially, and after the table moves past the center, the same operation is performed in connection with the other LED's.

Another feature is a SLOW APPROACH mode. This mode, as indicated above, finds best utilization in connection with the cylindrical grinder of FIG. 3, although it may of course be used in any kind of installation. In the case of a massive piece, such as the carriage, to be reversed in direction of movement, the reversal may produce a great inertial shock, and it is desired to slow the movement before it reaches the end of its movement in which it is to be reversed. In the case of the cylindrical grinder, to perform the best grinding operation, it is desired that the movement of the carriage proceed at uniform rate throughout the range in which the grinding wheel engages the steel roll, in order to produce a uniformly fine finish. It is only after the grinding wheel passes beyond the end of the steel roll that the SLOW APPROACH mode is to be brought into play. In the case of the cylindrical grinder of FIG. 3, an additional precaution must be observed to prevent the grinding wheel from encountering the frame of the grinder at point 233, and in this space 51a between the end of the steel roll and the frame, the carriage must be brought to a halt, for reversing, in the SLOW APPROACH mode.

To produce the SLOW APPROACH mode, it is again assumed that the traverse potentiometer 62 (E-4) (see also FIGS. 6 and 11) is rotating clockwise. The voltage at pin 3 of comparator 198 (F-6) and of comparator 236 (J-6) increases, and when it reaches the voltage of pin 2 of comparator 236 (J-6), as set by the slow approach potentiometer 164, pin 6 of that comparator, and pin 1 of gate 238 (K-9) goes HI. At this point also, pin 4 of gate 206 (F-11) is HI. Also pin 8 of gate 240 (J-8) is HI, thereby making pin 10 of gate 240 HI. This causes pin 3 of gate 238 (K-9) to go HI. When pin 3 of this gate is HI, voltage is applied to solid state relay 242 (J-10), energizing that relay, through diode 244 (K-9). As a result of this, the relay 59 (J-13) is energized, while the table is still moving to the LEFT, but at a reduced speed. The action in so reducing the speed under the control of the relay 59 (J-13) was discussed above, in connection with FIG. 6a.

At this time the voltage at pin 3 of the comparator 198 (F-6) is increasing, as noted above, and when it exceeds that at pin 2 of the comparator, the table reverses direction. Pin 4 of gate 206 (F-11) now goes LO, and this in turn sets pin 10 of gate 240 (J-8) and pin 3 of gate 238 (K-9) to go LO, and de-energizes relay 59 (J-13). At this point the table resumes its normal speed and the traverse potentiometers 62 (E-4), 63 (G-4), are rotating in counter-clockwise rotation.

As the next step, when the voltage at pin 3 of gate 234 (K-6) exceeds that of pin 2 of that gate, as set by right slow approach potentiometer 166 (K-4), pin 6 of gate 234 goes HI. This in turn switches pin 3 of gate 246 (K-7), and pin 12 of gate 248 (K-9) to HI. At this point pin 2 of gate 218 (F-11) is HI which makes pin 11 of gate 248 (K-9) HI, causing pin 4 of gate 250 (J-9) to go HI. When pin 4 of the gate 250 is HI, voltage is applied to the solid state relay 242 (J-10) and it is energized, through diode 252 (J-9). At this time the relay 59 (J-13) is energized, with the table still moving in the same direction, to the RIGHT, but at a reduced speed. Meanwhile the voltage at pin 3 of the comparator 200 (H-6) is increasing, and when it exceeds that at pin 2 of that comparator, pin 6 of that comparator goes HI. This causes the table to again reverse direction. Pin 2 of gate 218 (G-11) now goes LO and this in turn sets pin 13 of gate 248 (K-9) and pin 11 of that gate goes LO, thus resetting pin 4 of gate 250 (J-9) to LO. This shuts OFF the solid state relay 242 (J-10) and thereby de-energizes the relay 59 (J-13) and the table again resumes its normal speed.

The potentiometers 164 (J-4), 166 (K-4), also seen in FIG. 14, upon being manually adjusted determine the distance the carriage moves at a slow speed beyond the ends of the roll 52, such as between positions 54a, 54b, in FIG. 4.

Thus it will be seen that the reduced speed or SLOW APPROACH mode is controlled by the same relay 59 (J-13) in each direction, and while the table is being driven under the control of the other relays 64 (F-13) and 65 (I-13).

An additional great advantage of the apparatus is that the remote control can be adJusted while the table is moving, i.e. there is no need to stop the table for that purpose.

The term table as used in the claims is to be considered to cover carriage also, where appropriate.

We claim:
1. Apparatus for controlling a machine having a reciprocating table, and reversible electrical driving means for driving the table in each of opposite directions, and an electrical source and circuit for energizing the driving means, comprising,
    a pair of potentiometer units, one associated with each direction of movement of the table,
    (a) each potentiometer unit including an adjustable traverse potentiometer and a manually adjustable remote potentiometer,
    (b) the traverse potentiometer and remote potentiometer in each unit being operable for producing a first voltage and a second voltage respectively, in the corresponding direction of movement,
    the traverse potentiometers being progressively adjusted by the table in response to movement of the table and capable of varying the respective voltages corresponding to the movement of the table,
    the remote potentiometers being manually adjustably pre-set, and operably associated in circuit with the corresponding traverse potentiometers, and
    a pair of reversing means, one associated with each direction of movement of the table, and each being operable in response to the first voltage reaching a predetermined value relative to the second voltage in the corresponding direction of movement of the table, for reversing the driving means and, simultaneously therewith, thereby reversing the direction of movement of the table.

2. Apparatus according to claim 1 wherein, the traverse potentiometers, are mounted to a common shaft and actuated in unison by the table, and in opposite directions relative to the potential produced thereby.

3. Apparatus according to claim 1 wherein,
    the circuit includes gate means associated with each direction of movement, each having an output,
    each remote potentiometer assumes a normal set position and thereby produces a corresponding voltage and applies it to the gate means,
    each traverse potentiometer is operable for controlling the voltage thereof for thereby controlling the gate means and consequently producing a control signal at the output of the gate means, and
    said reversing means is operable in response to said control signal for so reversing the direction of movement of the table,
    the traverse potentiometers are mounted to a common shaft and actuated in unison by the table, each traverse potentiometer having a low end and a high end relative to the voltage controlled thereby, and arranged relative to each other so that as each is moving from the low end to the high end, the other is proceeding from the high end to the low end, and vice versa, and thereby only the one traverse potentiometer at its high end is capable of controlling the corresponding gate means and producing said control signal at the output thereof, and
    the reversing means includes a relay associated with each gate means and with a corresponding direction of movement of the table.
    whereby each relay is operable for effecting movement of the table, in its corresponding direction, to the exclusion of the operability of the other relay.

4. Apparatus according to claim 1 wherein,
    the remote potentiometers are adjustable effectively along the line of movement of the table, and spaced apart along that line, the table has a maximum range of movement, and has a central position adjacent the center of that range, the remote potentiometers are independently adjustable effectively away from each other to outer positions effectively at the corresponding ends of said maximum range, and independently adjustable effectively toward each other, and the apparatus includes means limiting the movement of the remote potentiometers toward each other to positions adjacent each other but spaced apart and predetermining a minimum range of movement of the table.

5. Apparatus according to claim 4 and further including:

means operable for enabling either remote potentiometer to be moved toward the other and, when in said adjacent positions, to move the other, while remaining spaced apart toward and to the end of the maximum range corresponding to the other, and thereby shifting the minimum range along the maximum range.

6. Apparatus according to claim 1 wherein, the remote potentiometers are manually adjustable independently of the traverse potentiometers, the traverse potentiometers and the remote potentiometers are mechanically independent of each other, and each remote potentiometer can be manually adjusted while the associated traverse potentiometer is being moved by the table, each remote potentiometer can be moved in either direction, and when it is moved toward the other remote potentiometer, the closer to the middle of the range of movement will the output signal be produced, and when it is moved away from the other remote potentiometer, the closer to the corresponding end of the range of movement will the output signal be produced.

7. Apparatus for controlling a machine having a reciprocable table movable throughout a normal maximum range, and a plurality of reversible electrical driving means for driving the table in each of opposite directions, and an electrical source and circuit for energizing the driving means, and the machine having control means for predetermining the movement of the table throughout the range, said apparatus comprising, a manually actuated adjustable first electrical control component operable for automatically predetermining a shorter range of movement of the table, less than said maximum range, and a manually actuated adjustable second electrical control component operable for de-energizing the first component and controlling movement beyond the ends of the shorter range.

8. Apparatus according to claim 7 and further including:

a relay for controlling each said driving means, first means responsive to movement of the table in each direction and operable for de-energizing the relay related to that direction of movement and energizing the other relay for driving the table in the opposite direction, said second electrical control component including a manually actuatable switch movable selectively to opposite positions corresponding to respective directions of movement of the table, and capable of being manually held in either of its opposite positions, and last means actuated by said switch operable in response to movement of the switch in either of its opposite directions, for disabling said first means and enabling the driving means associated with the direction of movement of the switch to continue driving the table in the same direction beyond the position of de-energization of the said relay related to that direction of movement of the table.

9. Apparatus for controlling a machine having a reciprocable table and means for driving the table in each of its opposite directions, the driving means having a normal speed, and a slow speed, for driving the table in corresponding speeds, the machine having first and second circuit portions for controlling the driving means respectively in normal and slow speeds, the apparatus comprising:

means actuated by the table and operable for reversing the driving means and thereby reversing the movement of the table at the end of the movement in each direction, at predetermined end points and thereby predetermining a maximum range of movement, first means for energizing the first circuit portion and thereby energizing the driving means at said normal speed at a middle portion of said maximum range, and second means for energizing the second circuit portion and thereby energizing the driving means at said slow speed at second points spaced inwardly from the end points, whereby to provide said slow speed of movement of the table at the ends of said maximum range and thereby reversing the movements of the table while the table is moving at said slow speed, said second means for energizing including elements operable for predetermining the points of reversal of the table at said slow speed, that are adjustable independently of each other and independently of said first means for energizing.

10. Apparatus according to claim 9 and further including:

a relay operably associated with the first circuit portion relative to each end of movement of the table, a traverse potentiometer operably associated with each relay and actuated by the table and operable thereby for controlling the voltage applied to the relay, and the relay in response to a predetermined voltage applied thereto, being operable for energizing the first circuit portion, and a single third relay operably associated with the second circuit portion, a slow approach potentiometer associated with each end of movement of the table and actuated by the table and operable thereby for controlling the voltage applied to the second circuit portion.

11. Apparatus according to claim 10 and including, manually actuated means for adjusting the slow approach potentiometers and correspondingly adjusting their points of effectiveness along the direction of movement of the table relative to ends of the maximum range of movement thereof.

12. Apparatus for controlling a machine having a reciprocable table and electrical means for driving the table in each of opposite directions, comprising, a traverse control unit and remote control unit, separate from each other and each being a mechanically self-contained unit, and the units being adapted to be mounted on the machine at mutually remote positions, the control units each including potentiometers, and electrical connections operably interconnecting the potentiometers in the two control units, the traverse control unit having a main shaft extending therefrom adapted to be rotated by the table, a plurality of potentiometers mounted to the shaft, individually operably related to respective opposite directions of movement of the table, and the shaft being operable upon rotation thereof for actuating the plurality of potentiometers.

13. Apparatus according to claim 12 wherein, the shaft includes an arm mounted thereon and the table has an inclined element for swinging the arm and rotating the shaft in response to movement of the table, the table is operable for moving the arm in one direction, and the traverse control unit includes a spring biasing the arm in the opposite direction.

14. Apparatus according to claim 13, wherein, the plurality of potentiometers have an operative range of nearly one revolution, said arm has an operative range of small angular movement, and the traverse control unit includes speed multiplying means for moving the plurality of potentiometers a greater amount than the main shaft.

* * * * *